US006843663B2

(12) United States Patent
Lee (10) Patent No.: US 6,843,663 B2
(45) Date of Patent: Jan. 18, 2005

(54) ELECTRONIC CARD CONNECTOR (75) Inventor: Ipson Lee, Taoyuan (TW)

(73) Assignee: Super Link Electronics Co., Ltd., Taoyuan City (TW)

( * ) Notice: Subject to any disclaimer, the term of this patent is extended or adjusted under 35 U.S.C. 154(b) by 0 days.

(21) Appl. No.: 10/453,494

(22) Filed: Jun. 4, 2003

(65) Prior Publication Data
US 2004/0248451 A1 Dec. 9, 2004

(51) Int. Cl.[7] .................................................. H01R 4/66
(52) U.S. Cl. ........................................................ 439/92
(58) Field of Search ..................... 439/92, 64, 326–328

(56) References Cited

U.S. PATENT DOCUMENTS 6,162,069 A * 12/2000 Choy ........................... 439/92
6,174,176 B1 * 1/2001 Hong ........................... 439/92
6,419,513 B1 * 7/2002 Choy .......................... 439/326
6,464,514 B1 * 10/2002 Tsai et al. ..................... 439/92

* cited by examiner

Primary Examiner—Gary Paumen
(74) Attorney, Agent, or Firm—Rosenberg, Klein & Lee (57) ABSTRACT An electronic card connector including a plastic main body having two lateral arms respectively extending from two sides of the main body and two grounding members respectively inserted with the lateral arms of the main body. Each grounding member has a U-shaped section for embracing the lateral arm so as to reinforce the lateral arm. The grounding member has a grounding resilient plate for resiliently abutting against a grounding contact of the bottom of an electronic card. The grounding member has a grounding conductive plate for soldering with a grounding circuit of a circuit board. The grounding member has two locating sections one of which abuts against a grounding contact of the top face of the electronic card to prevent the electronic card from upward skipping and the other of which extends into a locating dent of the electronic card to stop the electronic card from backing up.

7 Claims, 8 Drawing Sheets

ELECTRONIC CARD CONNECTOR

BACKGROUND OF THE INVENTION

1. Field of the Invention

The present invention is related to an electronic card connector including a plastic main body having two lateral arms. Two grounding members are inserted with two sides of the main body. Each grounding member has a U-shaped section for embracing the lateral arm of the main body so as to reinforce the lateral arm.

2. Description of the Prior Art

Figure 1:
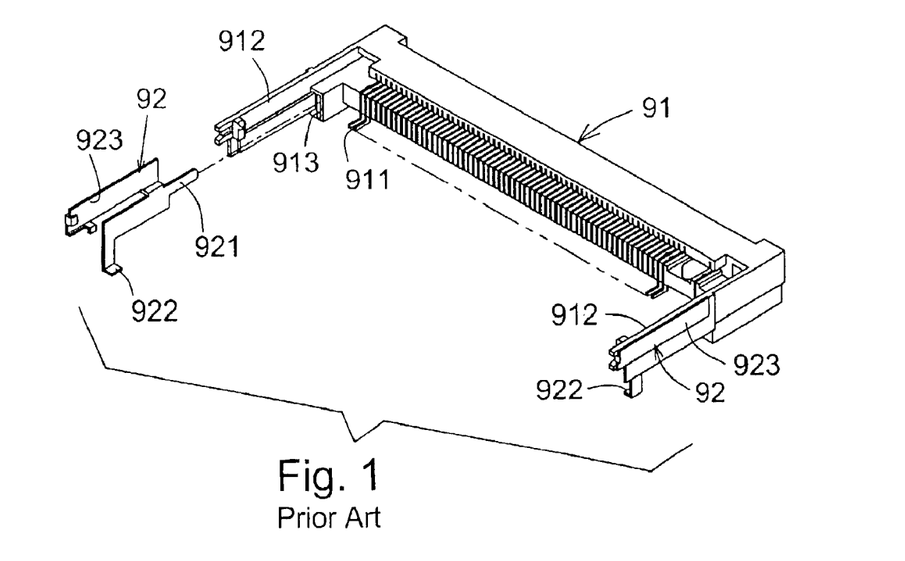
FIG. 1 is a perspective partially exploded view of a conventional electronic card connector.
Figure 2:
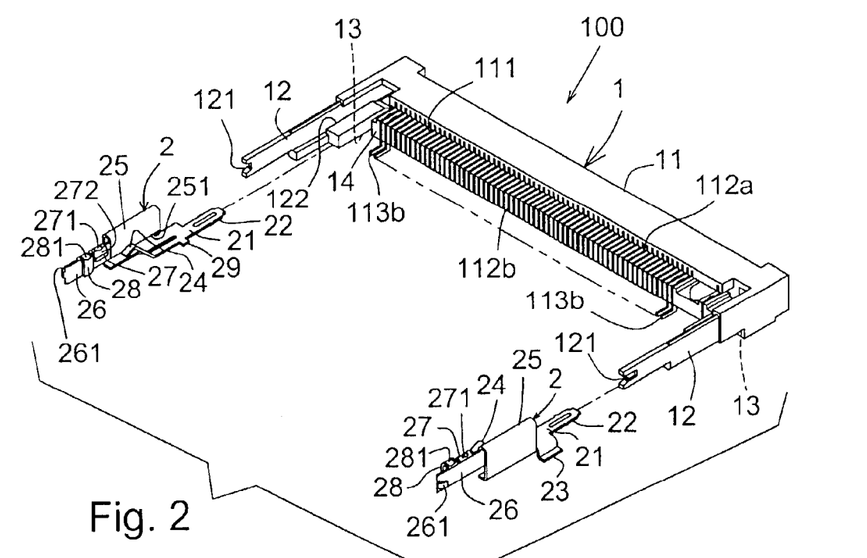
FIG. 2 is a perspective exploded view of the present invention.
Figure 3:
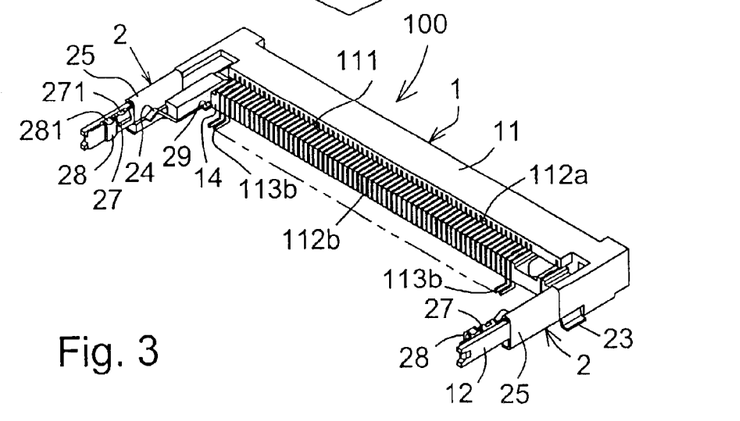
FIG. 3 is a perspective assembled view of the present invention.
Figure 4:
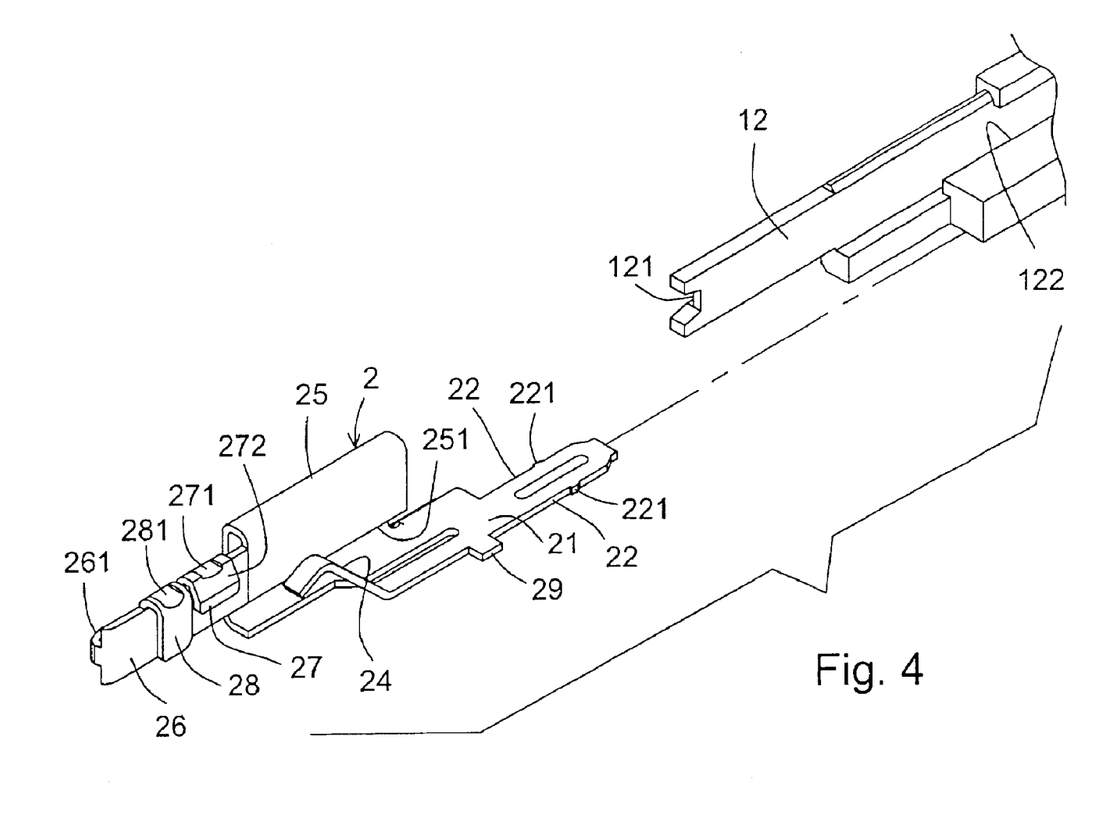
FIG. 4 is a perspective view of the grounding member of the present invention.
Figure 5:
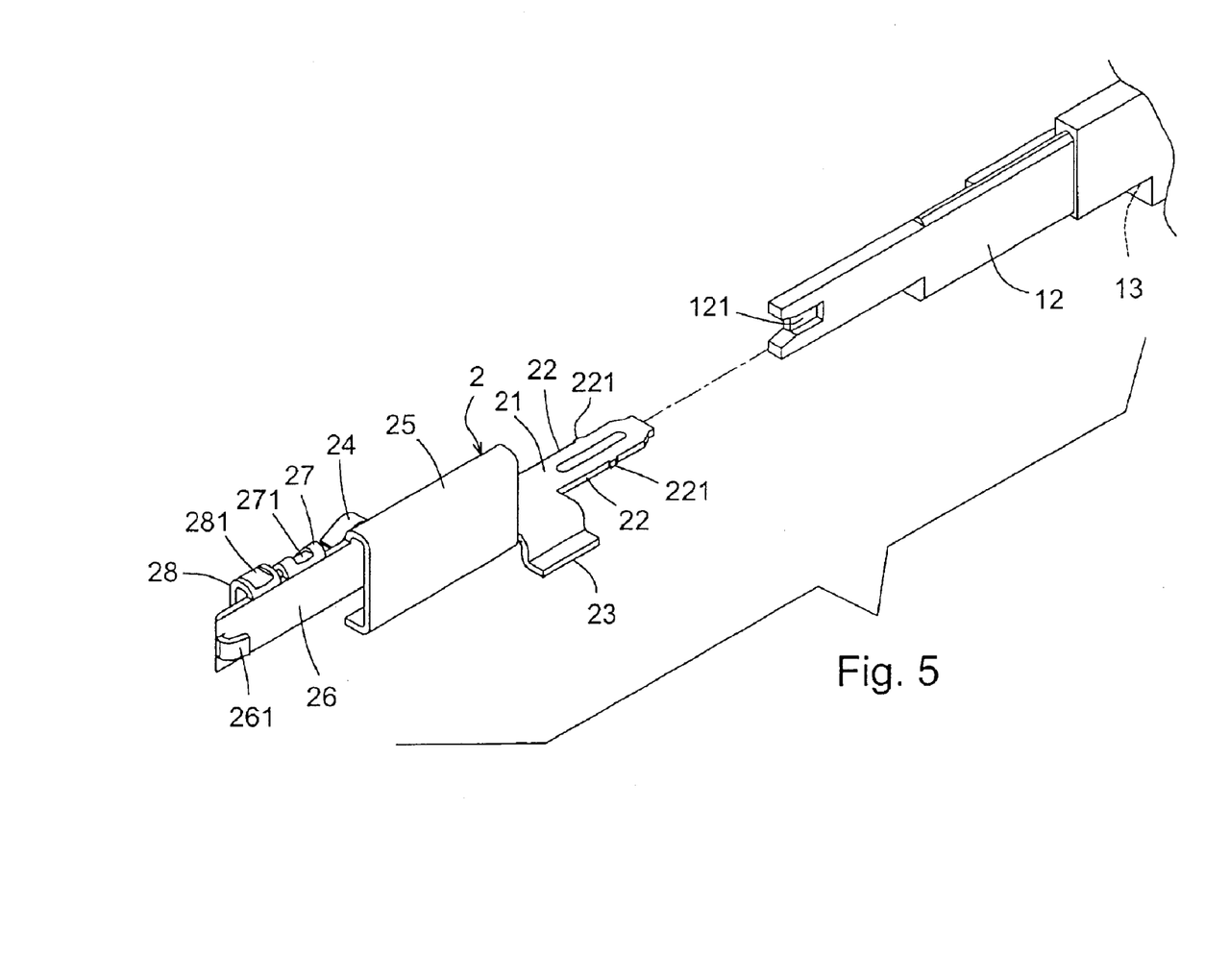
FIG. 5 is a perspective view of the grounding member of the present invention, seen in another direction.
Figure 6:
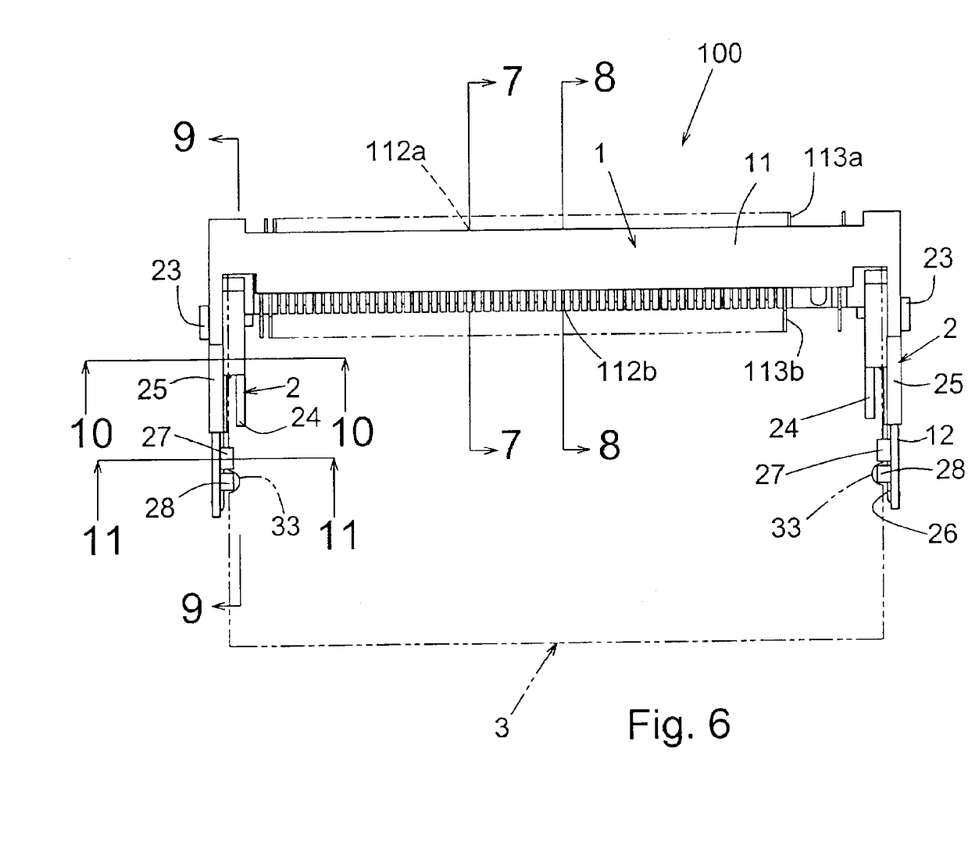
FIG. 6 is a top view of the present invention.
Figure 7:
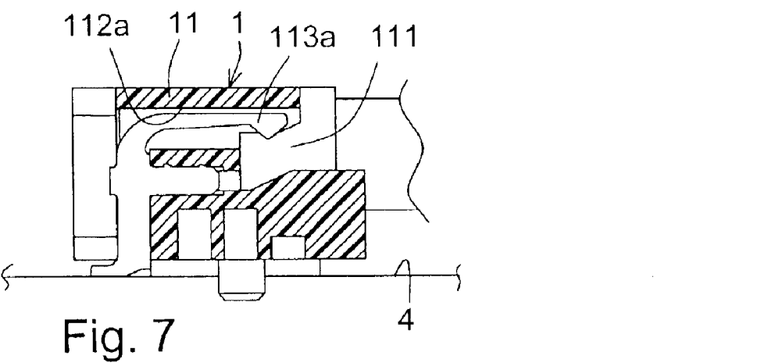
FIG. 7 is a sectional view taken along line 7—7 of FIG. 6.
Figure 8:
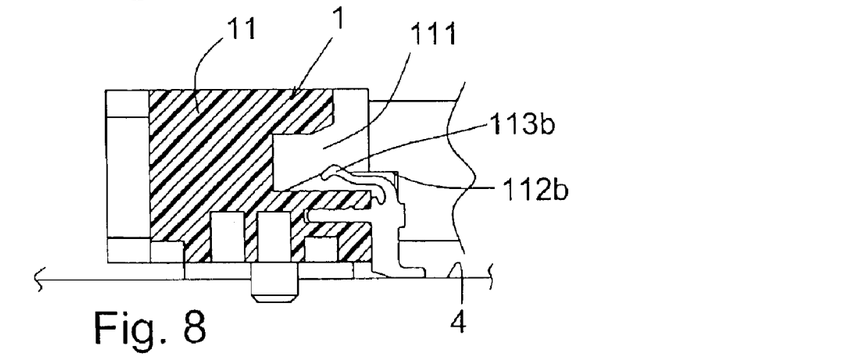
FIG. 8 is a sectional view taken along line 8—8 of FIG. 6.
Figure 9:
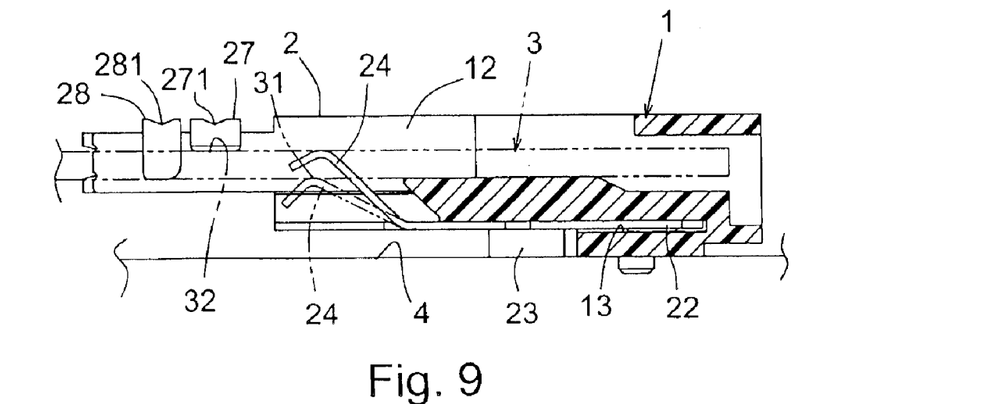
FIG. 9 is a sectional view taken along line 9—9 of FIG. 6.
Figure 10:
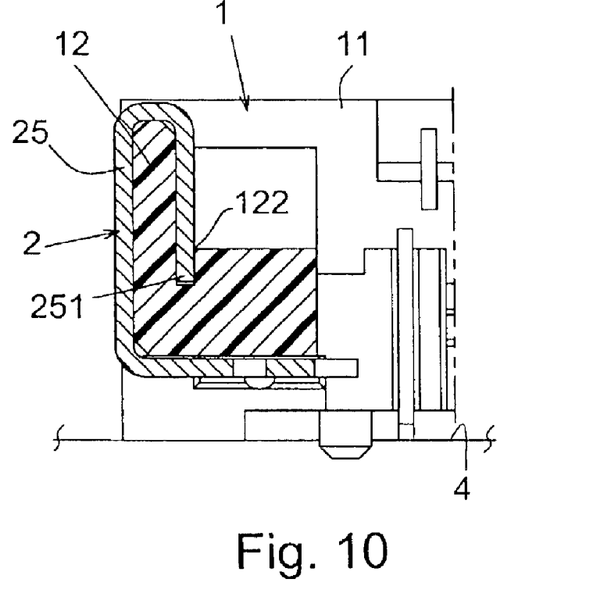
FIG. 10 is a sectional view taken along line 10—10 of FIG. 6.
Figure 11:
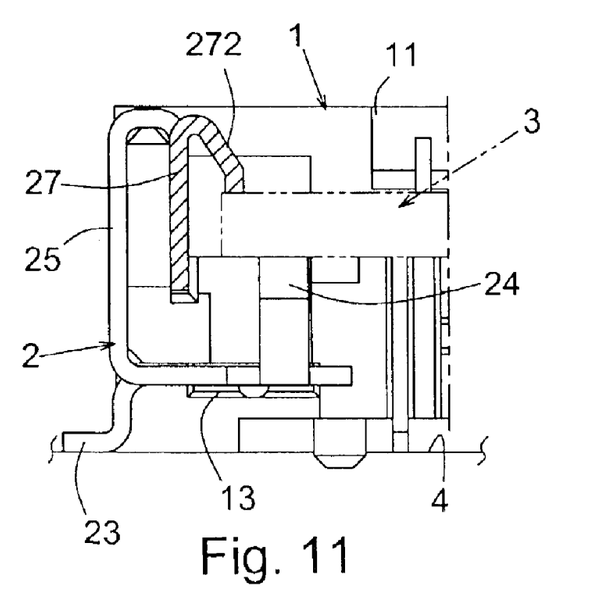
FIG. 11 is a sectional view taken along line 11—11 of FIG. 6.
Figure 12:
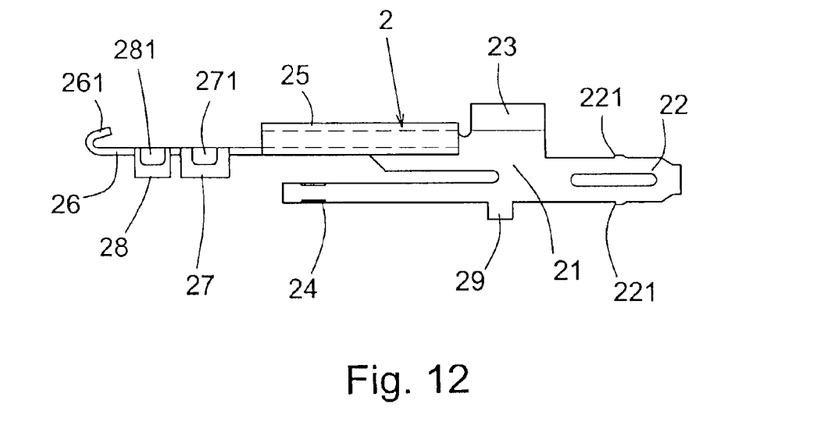
FIG. 12 is a top view of the grounding member of the present invention.
Figure 13:
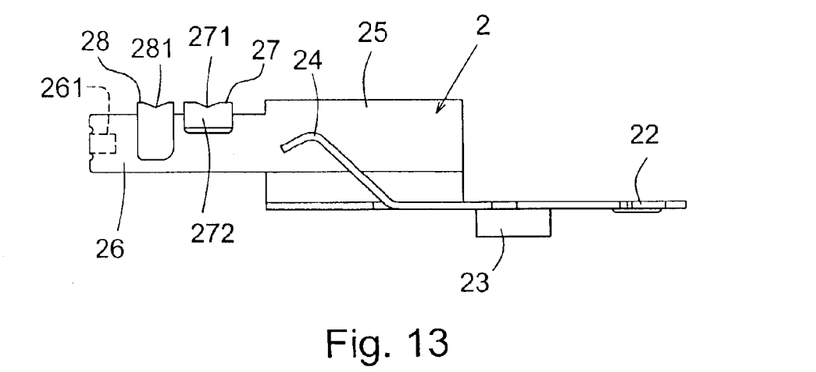
FIG. 13 is a side view of the grounding member of the present invention.

FIG. 1 shows a connector applied to an electronic card disclosed in the prior art. The connector includes a plastic main body 91. Multiple terminals 911 are side by side inlaid in the base section of the main body 91 for electrically connecting with an inserted electronic card. Two lateral arms 912 respectively extend from two sides of the main body 91. The connector further includes two fixing resilient plates 92. Each fixing resilient plate 92 has an insertion plate 921 inserted in the main body 91. A sidewall 923 radially projects from the fixing resilient plate 92. The sidewall 923 attaches to outer side of the lateral arm 912 of the main body 91 for reinforcing the lateral arm 912. In use, when taking out the electronic card, the lateral arms 912 are outward stretched. At this time, the fixing resilient plates 92 serve to prevent the lateral arms 912 from breaking. In addition, a connecting plate 922 downward projects from the fixing resilient plate 92 for adhering to the surface of a circuit board.

The above connector structure has some shortcomings as follows:

1. The lateral arm 912 of the plastic main body 91 is a quite elongated cantilever made of plastic material and having weak structural strength. Therefore, when inserting the insertion plate 921 of the fixing resilient plate 92 into the insertion hole 913 of the lateral arm 912, the lateral arm 912 is subject to breakage.

2. In use, when taking out the electronic card, it is necessary to outward stretch the lateral arms 912 which have weak structural strength. As a result, the lateral arms 912 are likely to break due to improper application force. This will end the using life of the connector.

3. The fixing resilient plate 92 lacks any grounding structure for contacting with the inserted electronic card to form a grounding circuit. Therefore, the quality of output signal of the electronic card will be affected.

4. When inserting the insertion plate 921 of the fixing resilient plate 92 into the insertion hole 913 of the plastic main body 91, the insertion plate 921 tends to be biased. This will deflect the connecting plate 922 to exceed the specification. As a result, the connecting plate 922 can hardly correctly contact with the circuit board (not shown) positioned thereunder. Therefore, in the case that the fixing resilient plate 92 is inserted in the main body 91 in a biased state and then adhered to the circuit board, a defective product with poor contact is produced.

SUMMARY OF THE INVENTION

It is therefore a primary object of the present invention to provide an electronic card connector including: a plastic main body having a base section, multiple terminals being inlaid in the base section for electrically connecting with an inserted electronic card, two lateral arms respectively extending from two sides of the base section; and two grounding members respectively inserted with two sides of the base section for connecting with a grounding circuit of a circuit board. Each grounding member has a U-shaped section integrally connected with a board body of the grounding member for embracing the lateral arm of the main body so as to reinforce the lateral arm. When taking out the electronic card, it is necessary to outward stretch the lateral arms. At this time, the U-shaped sections prevent the lateral arms from being broken so as to prolong the using life of the connector.

It is a further object of the present invention to provide the above electronic card connector in which each grounding member has a grounding resilient plate and a first and a second locating sections projecting from the grounding member. When inserting an electronic card into the electronic card connector, the grounding resilient plate of the grounding member resiliently abuts against a grounding contact of the bottom of the electronic card. The first locating section abuts against a grounding contact of the top face of the electronic card to prevent the electronic card from upward skipping. The second locating section correspondingly extends into a locating dent of the electronic card to stop the electronic card from backing up. Accordingly, the grounding resilient plate and the first locating section contact with the electronic card at many points to ensure the grounding.

The present invention can be best understood through the following description and accompanying drawings wherein:

DETAILED DESCRIPTIN OF THE PREFERRED EMBODIMENT

Please refer to FIGS. 2 to 13. The electronic card connector 100 of the present invention includes a plastic main body 1 having a base section 11. Two lateral arms 12 respectively extend from two sides of the base section 11. Two grounding members 2 are respectively inserted with two sides of the main body 1 for connecting with a grounding circuit of a circuit board 4. Each grounding member 2 has a U-shaped section 25 integrally connected with a board body 21 for embracing the middle of the lateral arm 12 of the main body 1 so as to reinforce the lateral arm 12.

Referring to FIGS. 2 to 8, the plastic main body 1 is integrally made, including a base section 11. One side of the base section 11 is formed with a socket 111 in which the front edge of an electronic card 3 is snugly inserted. The upper and lower sides of the socket 111 are respectively formed with multiple terminal caves 112a, 112b arranged side by side. Multiple terminals 113a, 113b are respectively inlaid in the terminal caves 112a, 112b for electrically connecting with an inserted electronic card 3. Two lateral arms 12 respectively extend from two sides of the base section 11. Two insertion dents 13 are formed in the base section 11. An insertion section 22 of the grounding member 2 is snugly inserted in each insertion dent 13.

Referring to FIGS. 2, 3 and 10 to 13, the grounding member 2 is made of a metal board material by integral punching. The grounding member 2 has a board body 21. The insertion section 22 forward extends from front edge of the board body 21. At least one ratchet 221 projects from a lateral side of the insertion section 22 for tightly fitting in the insertion dent 13 of the plastic main body 1. The grounding member 2 further has a grounding conductive plate 23 downward windingly extending from one side of the board body 21 for soldering with a grounding circuit of a circuit board 4. The grounding member 2 further has a grounding resilient plate 24 rearward, upward and obliquely projecting from an edge of the board body 21. The grounding resilient plate 24 has a free end. The grounding member 2 further has a U-shaped section 25 integrally connected with the board body 21 for embracing the middle of the lateral arm 12 of the main body 1 so as to reinforce the lateral arm 12. The grounding member 2 further has a hook arm 26 integrally rearward extending from the U-shaped section 25. A rear section of the hook arm 26 is formed with a hook section 261 for hooking a hook dent 121 of rear end of the lateral arm 12. The grounding member 2 further has a first locating section 27 downward windingly extending from one side of the hook arm 26 and a second locating section 28 also downward windingly extending from one side of the hook arm 26.

In addition, a stop shoulder 29 projects from one side of the board body 21 of the grounding member 2 for attaching to a shoulder section 14 of the main body 1.

Referring to FIGS. 4, 5 and 11 to 13, each of the first and second locating sections 27, 28 of the grounding member 2 is formed with at least one reinforcing rib 271, 281. In addition, an outer face of the first locating section 27 is formed with a guide slope 272 for guiding the electronic card 3 to smoothly latch into the connector 100.

The bottom edge of inner side of the lateral arm 12 of the main body 1 is formed with a groove 122. The bottom edge 251 of the free end of the U-shaped section 25 of the grounding member 2 is snugly fitted in the groove 122, whereby the U-shaped section 25 can tightly hold two sides of the lateral arm 12.

When a user inserts an electronic card 3 into the electronic card connector 100 of the present invention, the grounding resilient plate 24 of the grounding member 2 resiliently abuts against a grounding contact 31 of the bottom of the electronic card 3. The first locating section 27 abuts against a grounding contact 32 of the top face of the electronic card 3 to prevent the electronic card 3 from upward skipping. The second locating section 28 correspondingly extends into a locating dent 33 of the electronic card 3 to stop the electronic card 3 from backing up. Accordingly, the electronic card connector 100 of the present invention and the inserted electronic card 3 have multiple grounding contacts so that the electronic card 3 can transmit signal more stably.

According to the above arrangement, the electronic card connector 100 of the present invention has the following advantages:

1. The weakest sections of the lateral arms 12 of the plastic main body 1 are embraced by the U-shaped sections 25 of the grounding members 2. This avoids breakage of the lateral arms 12 and prolongs using life of the connector.
2. The grounding resilient plate 24 and the first locating section 27 of the grounding member 2 respectively tightly abut against the grounding contact 31 of the bottom of the electronic card 3 and the grounding contact 32 of the top face of the electronic card 3. Therefore, the electronic card connector 100 of the present invention contacts with the inserted electronic card 3 at many points to ensure the grounding.
3. The first and second locating sections 27, 28 of the grounding member 2 not only serve to stably locate the inserted electronic card 3, but also serve as the contacts of the grounding circuit.

The above embodiment is only used to illustrate the present invention, not intended to limit the scope thereof. Many modifications of the above embodiment can be made without departing from the spirit of the present invention.

What is claimed is:

1. An electronic card connector comprising:

(a) a plastic main body having a base section, multiple terminals being inlaid in the base section for electrically connecting with an inserted electronic card, two lateral arms respectively extending from two sides of the base section; and (b) two grounding members respectively engaging two sides of the base section for connection with a grounding circuit of a circuit board, each grounding member having a board body and a laterally extended U-shaped section integrally connected therewith and configured to substantially ensleeve a portion of one lateral arm of the main body so as to reinforce the lateral arm, each grounding member including a hook arm projecting laterally from the U-shaped section for engaging a terminal end portion of the lateral arm extending beyond the U-shaped section.

2. The electronic card connector as claimed in claim 1, wherein the grounding member further has a stop shoulder for attaching to a shoulder section of the main body.

3. An electronic card connector comprising:

(a) a plastic main body having a base section, multiple terminals being inlaid in the base section for electrically connecting with an electronic card, two lateral arms respectively extending from two sides of the base section; and (b) two grounding members respectively engaging two sides of the base section for connection with a grounding circuit of a circuit board, each grounding member having a board body and a U-shaped section interally connected therewith for embracing one of the lateral arms of the main body so as to reinforce the lateral arm;

wherein the grounding member is made of a metal board material by-integral punching, the grounding member having: a board body, an insertion section forward extending from a front edge of the board body, a ratchet projecting from a lateral side of the insertion section for tightly fitting in an insertion dent of the plastic main body; a grounding conductive plate extending in a downward windingly manner from one side of the board body for soldering with a grounding circuit of a circuit board; a grounding resilient plate rearwardly, upwardly and obliquely projecting from an edge of the board body, the grounding resilient plate having a free end; a hook arm rearwardly extending from the U-shaped section, a rear section of the hook arm being formed with a hook section for hooking a hook dent of a rear end of the lateral arm; a first locating section extending in downward winding manner from one side of the hook arm; and a second locating section extending in downward winding manner from one side of the hook arm.

4. The electronic card connector as claimed in claim 3, wherein each of the first and second locating sections of the grounding member is formed with a reinforcing rib.

5. The electronic card connector as claimed in claim 3, wherein an outer face of the first locating section of the grounding member is formed with a guide slope for guiding the electronic card to smoothly latch into the electronic card connector.

6. The electronic card connector as claimed in claim 2, wherein a bottom edge of an inner side of each lateral edge of the main body is formed with a groove, a bottom edge of a free end of the U-shaped section of the grounding member being snugly fitted in the groove.

7. The electronic card connector as claimed in claim 3, wherein the grounding member further has a stop shoulder for attaching to a shoulder section of the main body.

* * * * *